United States Patent [19]
Jones

[11] Patent Number: 6,120,073
[45] Date of Patent: Sep. 19, 2000

[54] DEVICE FOR GATHERING AND LIFTING LEAVES

[76] Inventor: George William Jones, 7607 S. Marion, Tulsa, Okla. 74136

[21] Appl. No.: 09/190,468

[22] Filed: Nov. 12, 1998

[51] Int. Cl.⁷ .................................................. A01D 7/00
[52] U.S. Cl. ........................... 294/50.8; 294/58; 294/118; 56/400.12
[58] Field of Search ................... 294/50.6–50.9, 294/51, 58, 118; 56/400.11, 400.12, 400.19

[56] References Cited

U.S. PATENT DOCUMENTS

| | | | |
|---|---|---|---|
| D. 384,865 | 10/1997 | Baran | 294/50.8 |
| 407,465 | 7/1889 | Brick . | |
| 851,987 | 4/1907 | Hewitt | 294/118 |
| 1,005,247 | 10/1911 | Lovett | 294/118 |
| 2,088,890 | 8/1937 | Winby et al. . | |
| 3,164,945 | 1/1965 | Spencer . | |
| 3,228,716 | 1/1966 | Parkin . | |
| 3,269,764 | 8/1966 | Coleman | 294/118 |
| 3,350,866 | 11/1967 | Spencer . | |
| 3,572,806 | 3/1971 | Sivadon | 294/118 |
| 3,601,966 | 8/1971 | Kerry . | |
| 3,604,687 | 9/1971 | Moore . | |
| 3,643,410 | 2/1972 | Menning . | |
| 3,688,484 | 9/1972 | Cox . | |
| 3,692,347 | 9/1972 | Bixler | 294/50.8 |
| 3,749,429 | 7/1973 | Hauber . | |
| 3,833,250 | 9/1974 | Lawrence | 294/50.8 |
| 4,037,397 | 7/1977 | Fiorentino . | |
| 4,477,114 | 10/1984 | Callis . | |
| 4,991,386 | 2/1991 | Dirksen . | |
| 5,020,935 | 6/1991 | Lewis et al. . | |
| 5,114,199 | 5/1992 | Newcomer . | |
| 5,459,988 | 10/1995 | Glaser . | |
| 5,564,266 | 10/1996 | Laughlin . | |
| 5,564,267 | 10/1996 | Bricker et al. . | |
| 5,727,828 | 3/1998 | Jones . | |
| 5,788,608 | 8/1998 | Wilkinson . | |

FOREIGN PATENT DOCUMENTS

| | | | |
|---|---|---|---|
| 1430272 | 1/1965 | France . | |
| 141333 | 11/1934 | Germany | 294/50.6 |
| 509486 | 1/1955 | Italy . | |
| 44635 | 6/1917 | Sweden . | |
| 896964 | 5/1962 | United Kingdom . | |
| 983397 | 2/1965 | United Kingdom . | |
| 2277857 | 11/1994 | United Kingdom . | |

*Primary Examiner*—Dean J. Kramer
*Attorney, Agent, or Firm*—Molly D. McKay

[57] ABSTRACT

A device for gathering and lifting leaves that utilizes a specially designed pair of leaf scoops that are pivotally secured to each other in opposing orientation via their handles. Each of the leaf scoops is provided with a separate pivotal axis that extends through the handle of the leaf scoop. The leaf scoops are offset from each other so that the handles can be operated like the handles of a pair of scissors in order to open and close the heads of the leaf scoops relative to each other, thereby capturing leaves between the scoop heads so the leaves can be transported and so the leaves can be released when the leaves have been transported to the desired location. The device is provided with a central handle that attaches midway between the pivotal axes so that the user can grasp the central handle when lifting the device and the leaves.

13 Claims, 9 Drawing Sheets

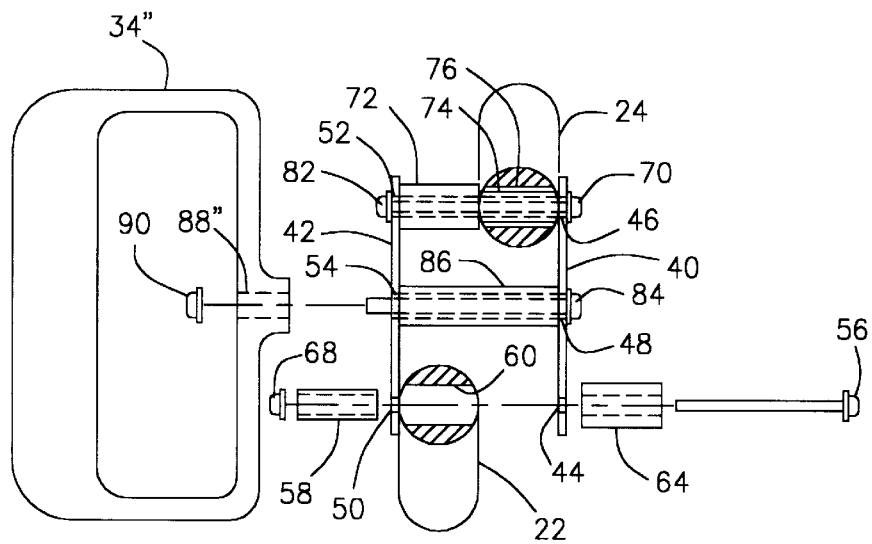
Fig. 10
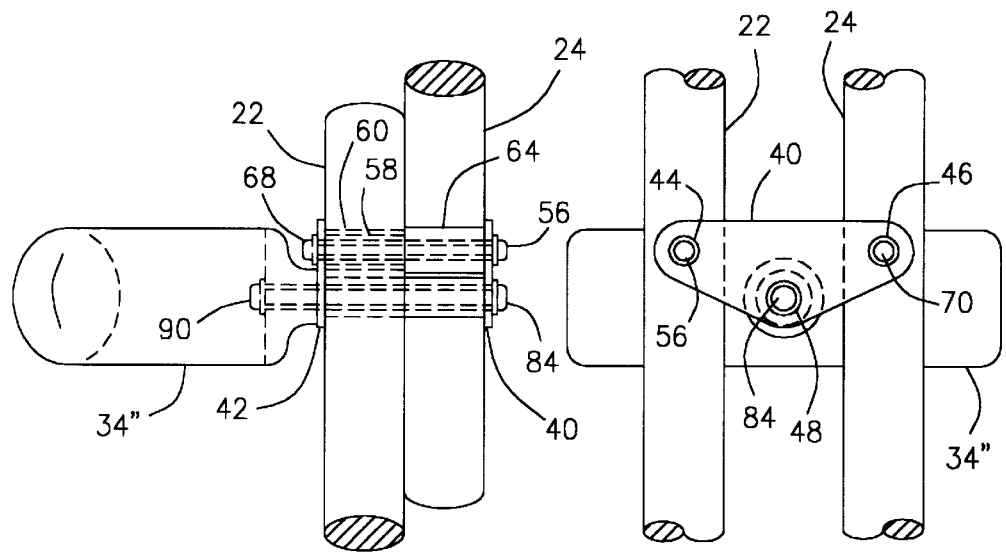
Fig. 11
Fig. 12

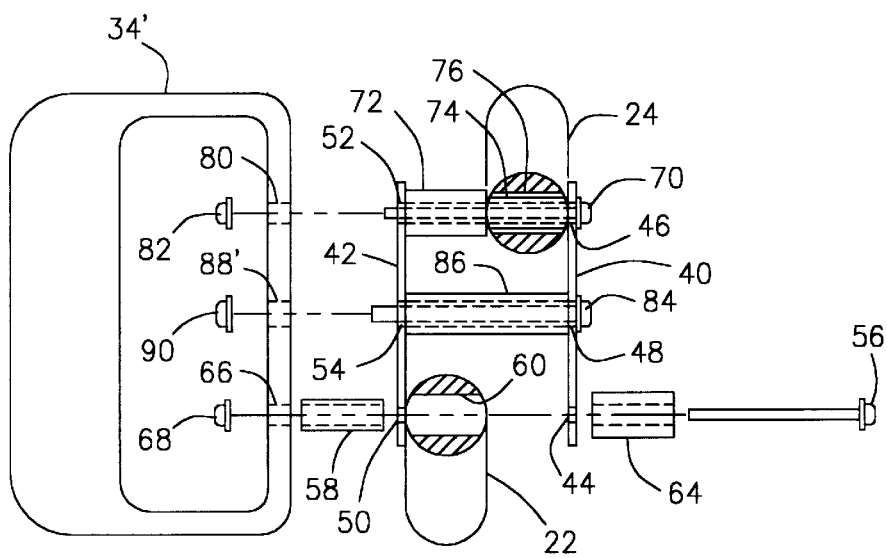
Fig. 13
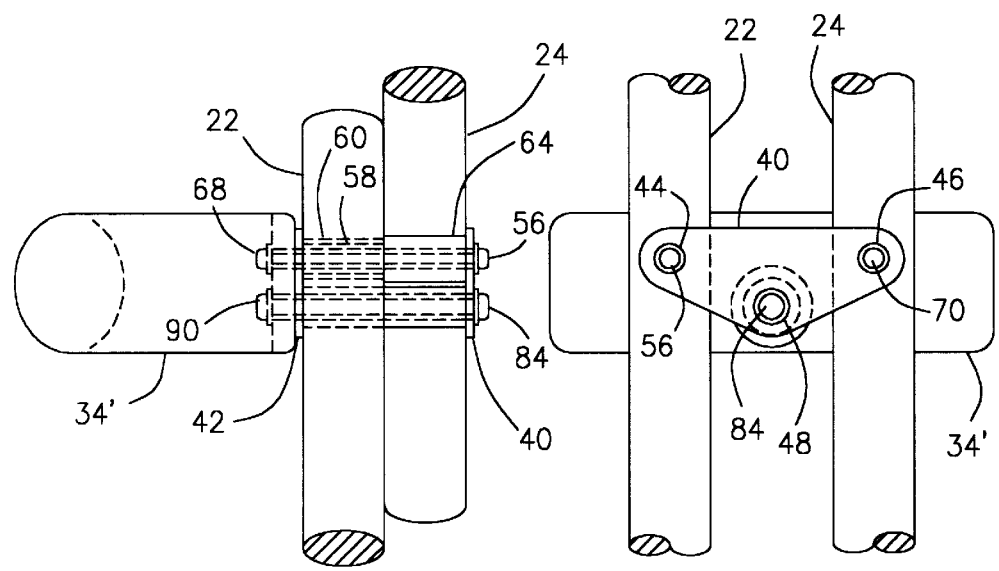
Fig. 14
Fig. 15

DEVICE FOR GATHERING AND LIFTING LEAVES

BACKGROUND OF THE INVENTION

1. Field of the Invention

The present invention relates to a device for gathering and lifting leaves and other loose debris. Specifically, the present invention employs a pair of concave shaped leaf scoops that are movably secured together via their handles so that the leaf scoops articulate in opposing fashion and are provided with a central handle at the junction where they are movably secured together. The central handle aids the user in lifting the leaves when they are grasped between the heads of the leaf scoops. The device may include a central handle that is one of a variety of different types of handles.

2. Description of the Related Art

In the fall of the year, homeowners and owners of commercial property on which trees are located must gather together and dispose of the large volume of leaves and other loose debris that falls to the ground from the trees.

Leaves may be gathered by using leaf scoops, leaf blowers or power lawn mowers equipped with bags. Once the leaves have been gathered, property owners must lift the leaves for in order to remove them from the property or to transport them to a compost bin. Alternately, to avoid lifting, leaves may be burned in place. Leaf blowers and lawn mowers create air pollution, and for this reason, their use has been banned in some communities. Also, open burning of leaves has been banned in some communities due to fire hazards, air pollution and ozone damage caused by this practice. Thus, manually raking leaves remains the best environmental solution for gathering leaves.

Gathered leaves are typically lifted by bending over and picking up small quantities by hand. Another method is to scoop the pile of leaves onto a blanket or tarpaulin, then stoop down to lift the corners of the blanket or tarpaulin and finally dragging or lifting the leaves and the blanket or tarpaulin in order to move the leaves to a trash receptacle, compost pit or other disposal area.

A person may employ a specially designed plastic ramp which inserts into the mouth of a trash bag, allowing the user to scoop leaves into the trash bag when the bag is placed horizontally on the ground. The bag and leaves must then be lifted to transport them. Various other devices have been created for transporting leaves, also. One such device simply drills holes in the handles of two conventional leaf rakes, and inserts a bolt through the holes so that the two opposing leaf rakes are able to move in opposition to each other, similar to the action of a large pair of salad thongs, in order to capture leaves between the rake heads and lift them so they can be placed in a bag for disposal.

These types of devices lack a handle at a critical location on the device, such as at the junction of the rakes, this causing the user to repeatedly bend over, stoop down and lift the leaves in an awkward way that exerts a great deal of strain on the user's back. If the user has large volumes of leaves to transport, he may end up with strained or pulled back muscles before the job is completed Also, the heads of standard or conventional leaf rakes are not designed to lift, but rather are designed to rake. And the open construction of most conventional leaf rakes, i.e. constructed of tines, slats or spaced apart teeth, prevents them from holding leaves between the rake heads as the leaves are lifted after the leaves have been captured between the opposing rake heads.

The present invention addresses these problems by providing a device that includes a pair of leaf scoops with specially designed concave heads for capturing and holding leaves therebetween as the leaves are lifted and transported. The present invention is also provided with a junction for movably securing the two leaf scoops together. This junction includes a handle that permits the user to stand upright and easily lift large, heavy masses of leaves or other material without straining the user's back. Further the present invention allows the user to capture, lift, transport, and accurately deposit a large quantity of leaves in a trash receptacle or other desired location.

SUMMARY OF THE INVENTION

The present invention is a device that consists of two specially designed leaf scoops that movably secure together via a junction that secures the handles of the two leaf scoops in an opposing, articulating manner. The junction is provided with a central handle that extends outward from the junction in an orientation that is approximately perpendicular to each of the leaf scoop handles. Each leaf scoop is provided with a concave head for capturing and holding leaves between it and the concave head of its associated leaf scoop. Each scoop head has an increased width dimension and an increased concave depth over common leaf rakes in order to allow a larger volume of leaves to be captured between the modified scoop heads when the scoop heads are moved toward each other and to more freely release the leaves when the scoop heads are moved away from each other.

Leaves are captured between the heads of the leaf scoops by opening and closing the heads relative to each other in scissors fashion. This is done by grasping the upper end of the leaf scoop handles and pulling the handles apart in order to cause the leaf scoop heads to move away from each other. Likewise, the leaf scoop heads may be made to move toward each other by pushing the handles of the leaf scoop toward each other. A person can employ the device to capture leaves between the scoop heads for transport, to transport the leaves, and to release the leaves from between the scoop heads at the desired destination.

In order to use the invention, it is desirable to first rake the leaves into a pile or row with a conventional leaf rake with tines. The user then grasps the scoop handles of the device with his hands so one hand grasps only one scoop handle and the central handle is extending outward from the device toward the users body. The user then pushes the scoop handles apart to open the scoop heads relative to each other, places the scoop heads on opposite sides of the pile of leaves, and then moves the handles of the two leaf scoops together to capture the leaves between the two scoop heads. With the handles of the two leaf scoops now together, the user then grasps both leaf scoop handles in his non-dominant hand, releases his dominant hand from the leaf scoop handle, and grasps the central handle with his dominant hand.

The user then lowers his non-dominant hand and raises his dominant hand to lift the leaf scoops to a position that is approximately horizontal and parallel with the ground. The leaves may be transported by the user in this approximately horizontal position until the scoop heads and captured leaves are positioned above the desired deposit location, such as for example a trash receptacle. Then the user releases from the user's non-dominant hand the scoop handle that is furthest from the user, allowing the leaf scoop heads to spring apart under pressure from the leaves that are compressed therebetween. The leaf scoops may be rotated approximately 90° to allow the leaves to fall under the influence of gravity out of the leaf scoop heads and to be deposited in the desired location.

The invention employs two brackets, both of which are provided with three bolt openings therethrough so that each of the bolt openings in the first bracket aligns with an associated bolt opening in the second bracket. A bolt extends through each of the aligned bolt openings. A first bolt extends consecutively through a first bolt opening in the first bracket, a first sleeve that inserts in a hole that extends through the first leaf scoop handle, a first spacer, and a first bolt opening in the second bracket. The first bolt may also, optionally, extends through an opening provided in the central handle, depending on the style of central handle employed. A first nut secures the first bolt.

A second bolt extends consecutively through a second bolt opening in the first bracket, a second spacer, a second sleeve that inserts in a hole that extends through the second leaf scoop handle, and a second bolt opening in the second bracket. The second bolt may also, optionally, extend through another opening provided in the central handle, depending on the style of central handle employed. A second nut secures the second bolt.

A third bolt extends consecutively through a third bolt opening in the first bracket, a third sleeve that extends between the first and second brackets, a third bolt opening in the second bracket, and an opening in the central handle. A third nut secured the third bolt.

While the invention is described for use with leaves, it is not so limited and may also be used with snow, small branches or other types of debris.

BRIEF DESCRIPTION OF THE DRAWINGS

FIG. 10 is an partially cut away and enlarged, cross sectional view of the device, similar to FIG. 1, only with a first alternate central handle.

FIG. 11 a right side elevation of the device shown in FIG. 10.

FIG. 12 is a rear elevation of the device of FIG. 10.

FIG. 13 is an partially cut away and enlarged, cross sectional view of the device, similar to FIG. 1, only with a second alternate central handle.

FIG. 14 a right side elevation of the device shown in FIG. 13.

FIG. 15 is a rear elevation of the device of FIG. 13.

DETAILED DESCRIPTION OF THE PREFERRED EMBODIMENT INVENTION

Figure 1:
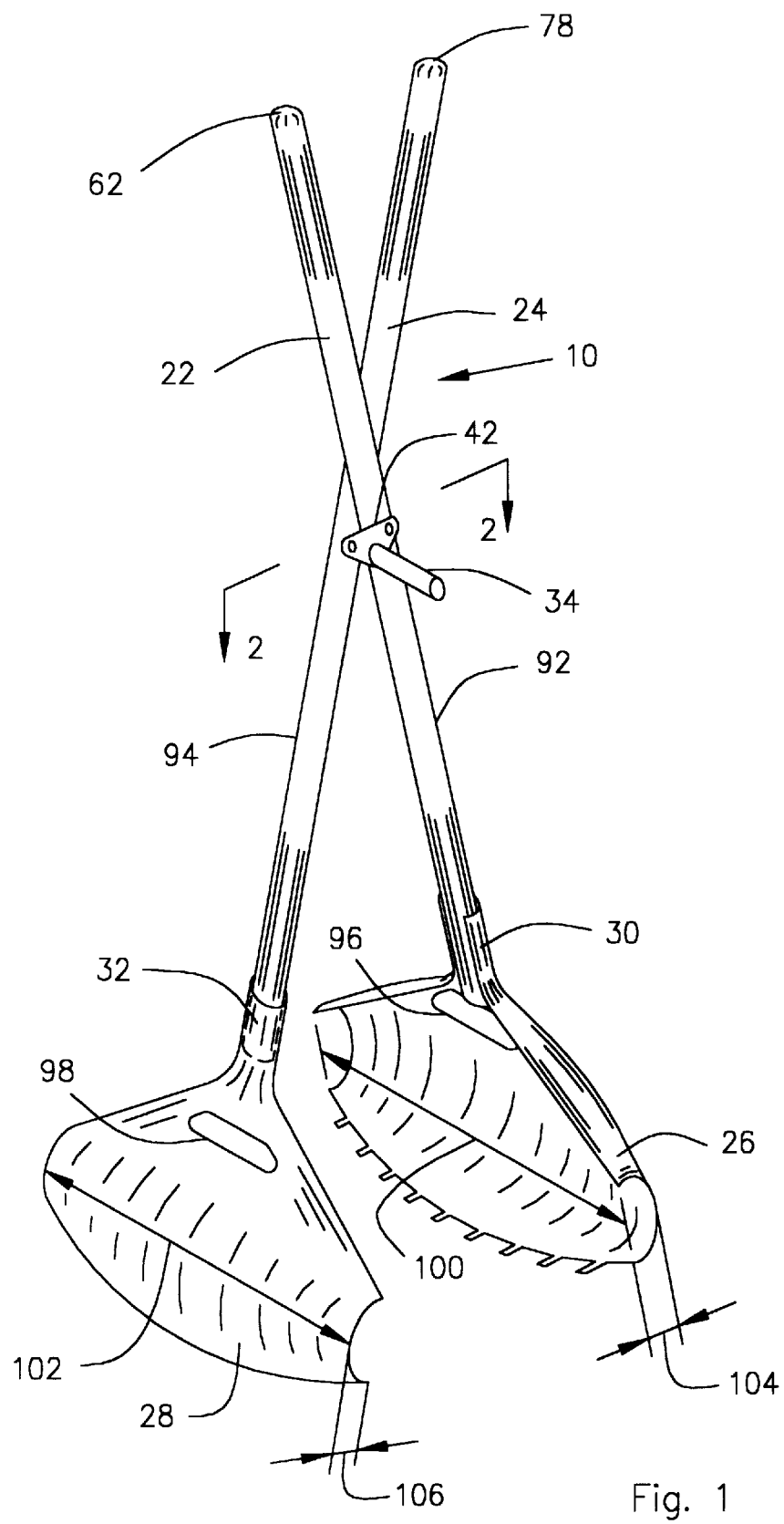
FIG. 1 is a perspective view of a device constructed in accordance with a preferred embodiment of the present invention.
Figure 5:
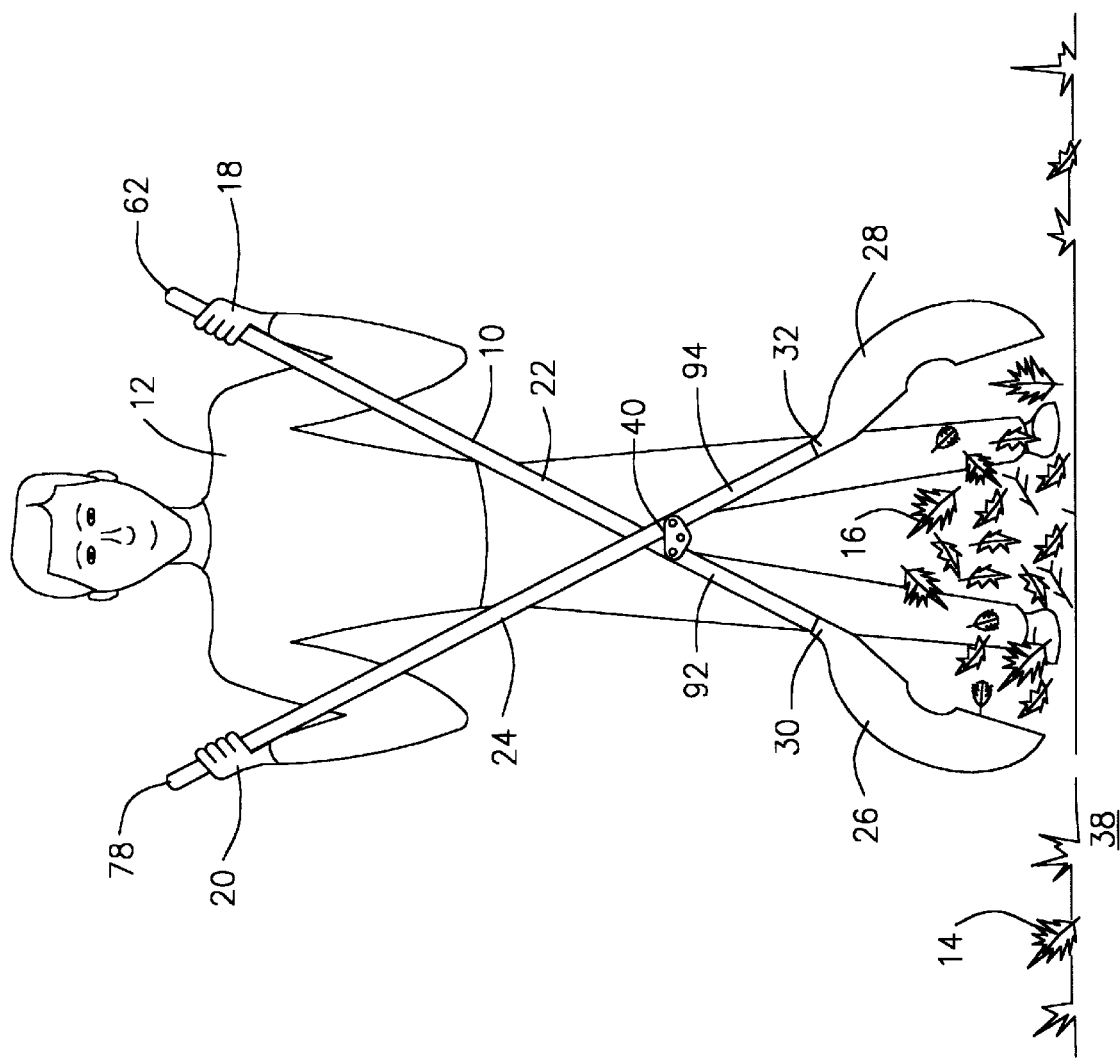
FIG. 5 is a perspective view of a person using the device of FIG. 1 to grasp a pile of leaves.

Referring now to the drawings and initially to FIG. 1, there is illustrated a device 10 constructed in accordance with a preferred embodiment of the present invention. FIGS. 5 through 9 show sequentially how the device 10 is be employed by a person 12 to transport leaves 14. Leaves 14 are initially gathered into a pile 16, as illustrated in FIG. 5, employing a conventional leaf rake with tines (not illustrated) or other suitable leaf gathering means. Then the device 10 is grasped by the person 12 by placing his hands 18 and 20 on scoop handles 22 and 24 provided on the device 10 so that a first hand 18 grasps the first scoop handle 22 and a second hand 20 grasps the second scoop handle 24.

The scoop handles 22 and 24 are then pulled apart, as illustrated in FIG. 5, in order to move the scoop heads 26 and 28 away from each other. The first scoop head 26 is attached to a lower end 30 of the first scoop handle 22, and the second scoop head 28 is attached to a lower end 32 of the second scoop handle 24.

Figure 6:
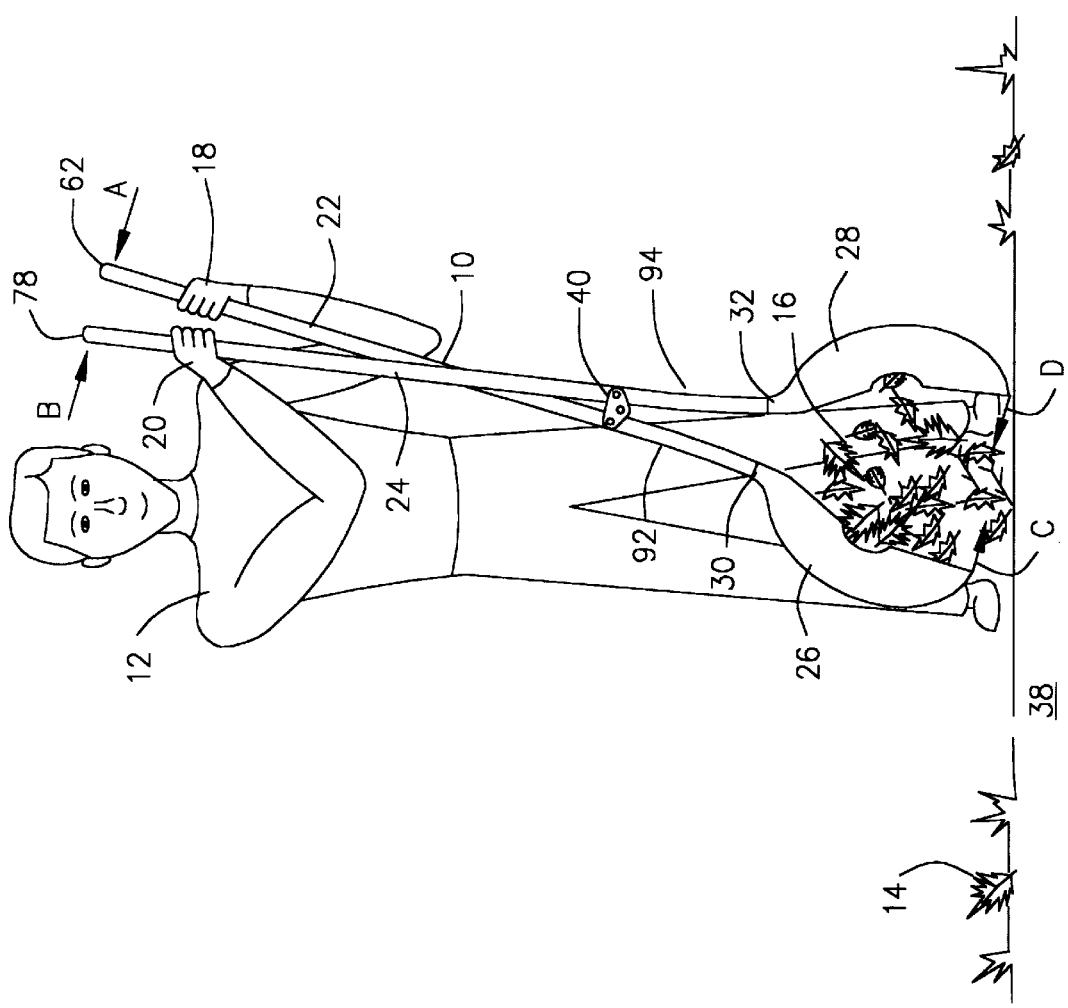
FIG. 6 is a perspective view of the person of FIG. 5 pulling the handles of the two leaf scoops of the device toward each other, illustrating flexing of the leaf scoop handles.

The device 10 is then placed over the pile 16 of leaves 14, and, as illustrated in FIG. 6, the scoop handles 22 and 24 are then pushed together, as shown by Arrows "A" and "B", thus capturing the leaves 14 between the scoop heads 26 and 28 as the scoop heads 26 and 28 move toward each other, as shown by Arrows "C" and "D".

Figure 7:
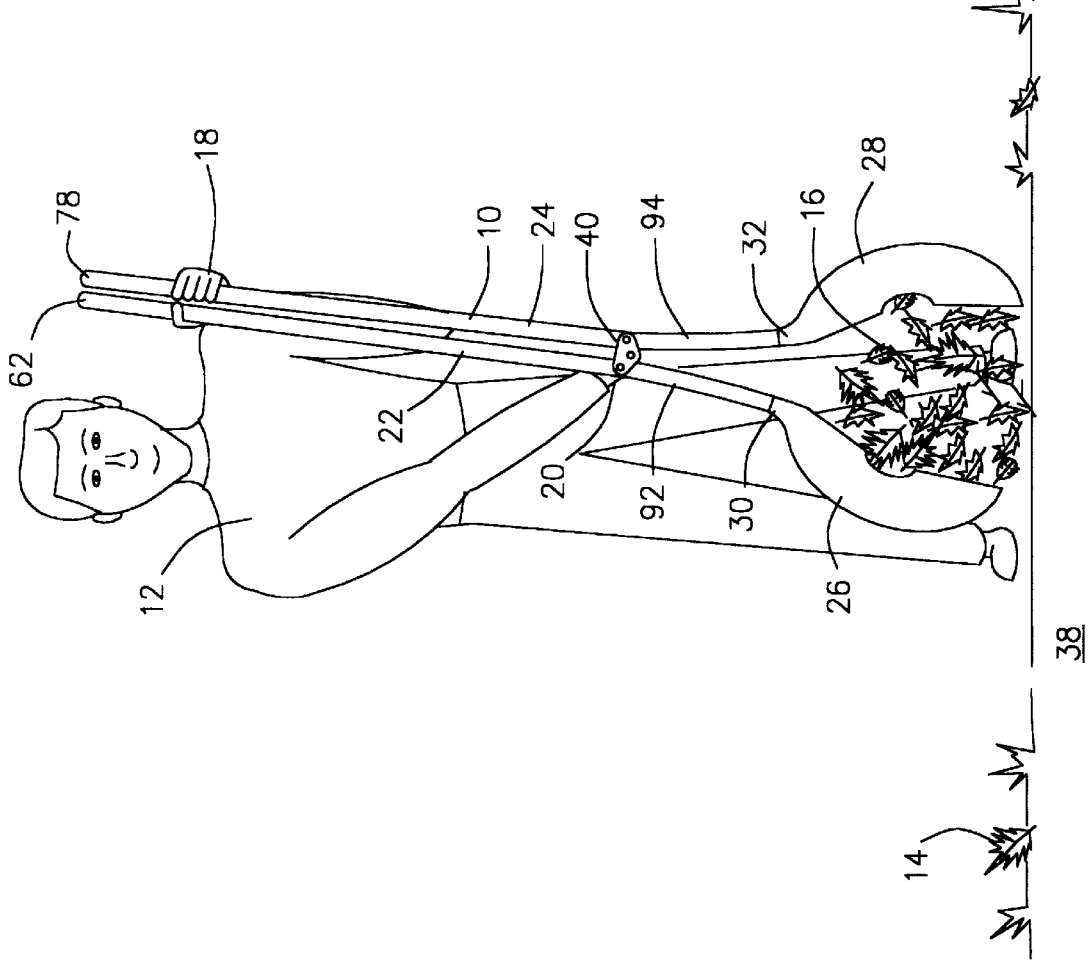
FIG. 7 is a perspective view of the person of FIGS. 5 through 6 grasping the scoop handles of the device with one hand and grasping a central handle of the device with another hand.

As illustrated in FIG. 7, the person 12 then grasps both of the scoop handles 22 and 24 in the person's non-dominant hand 18, i.e. the left hand for a person who is right handed, or alternately, the right hand for a person who is left handed. The dominant hand 20 then releases the scoop handle 24. For purposes of illustration, the person 12 shown in the illustrations is assumed to be right handed, and the left hand will be referred to alternately as the first hand, the left hand or the non-dominant hand 18. Likewise, the right hand of the person 12 will be referred to alternately as the second hand, the right hand or the dominant hand 20.

Figure 8:
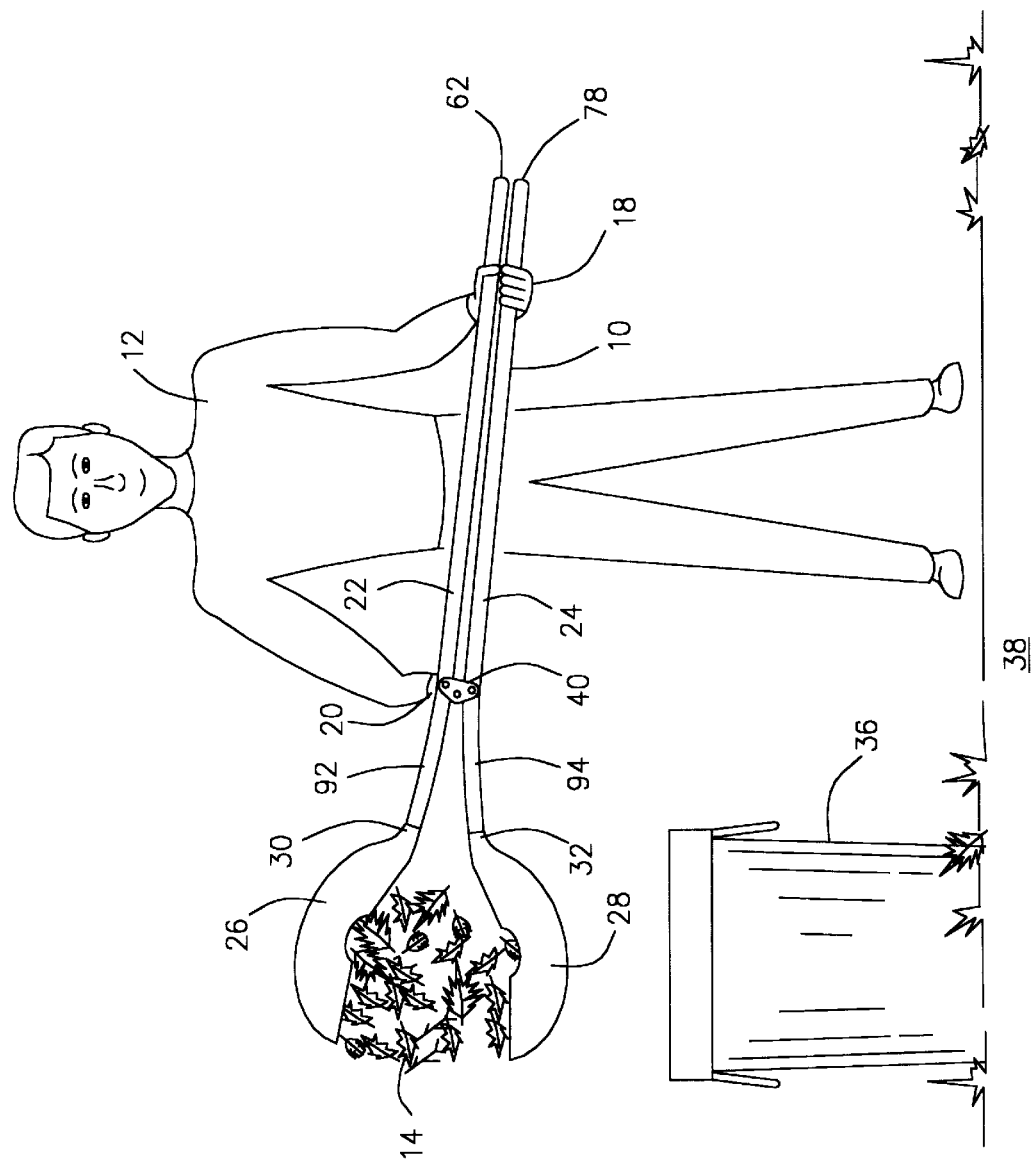
FIG. 8 is a perspective view of the person of FIGS. 5 through 7 lifting the leaves with the device.

The dominant hand 20 of the person 12 is then free to grasp a central handle 34 provided on the device 10. As illustrated in FIG. 8, the person 12 then lifts the scoop heads 26 and 28 in order to carry the captured leaves 14 to a place where the leaves 14 are to be deposited, such as for example a trash receptacle 36.

Figure 9:
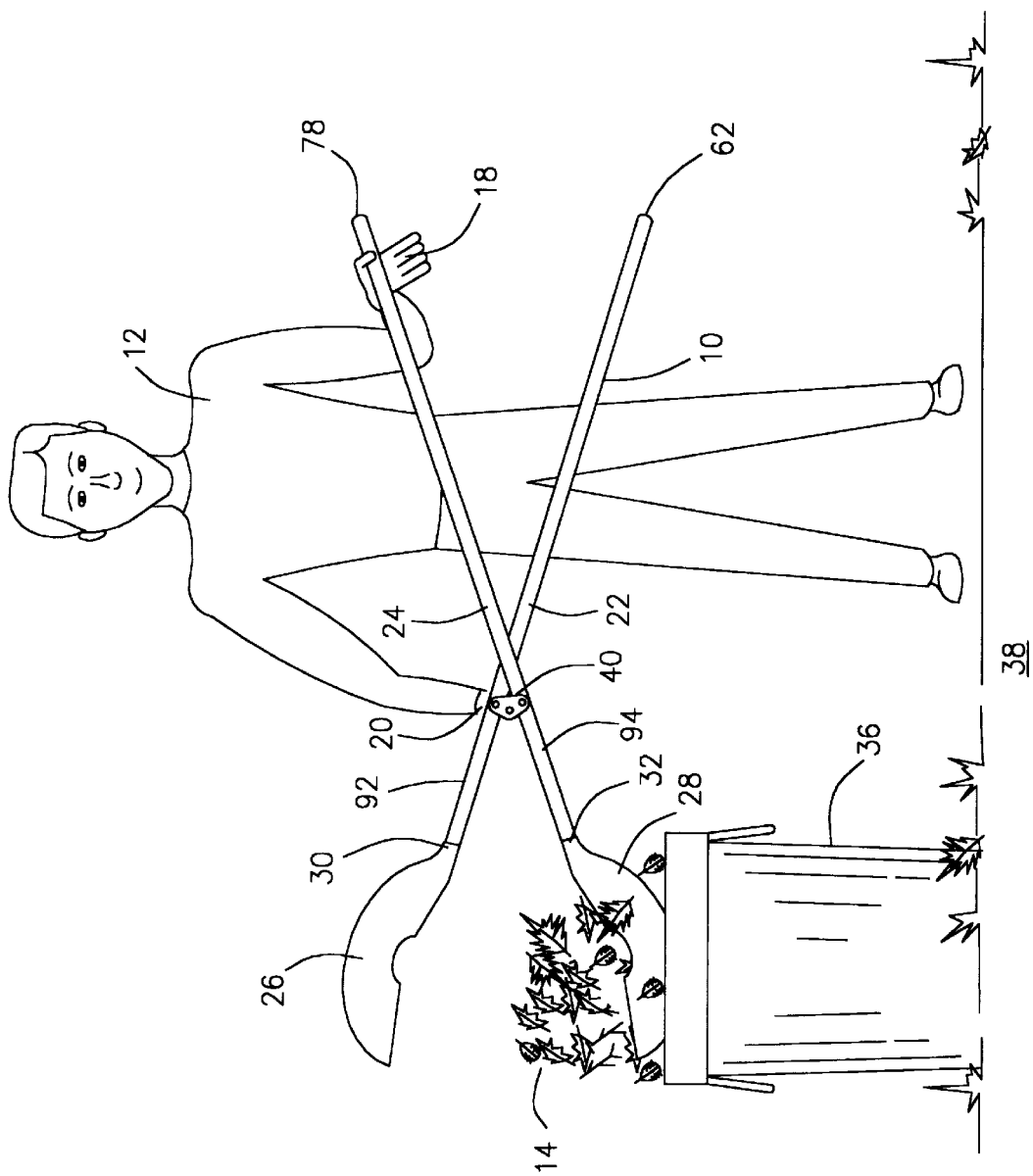
FIG. 9 is a perspective view of the person of FIGS. 7 through 11 releasing the leaves from the junction with a handle by allowing one of the scoop handles to slip from his hand, while maintaining a grip on the central handle and the other scoop handle.

As illustrated in FIG. 9, once the scoop heads 26 and 28 are positioned above the trash receptacle 36, the person 12 releases the scoop handle, either 22 or 24, from the non-dominant hand 24, allowing the released scoop handle 22 or 24 to spring outward away from the person 12 and releasing the leaves 14, which fall under the influence of gravity into the trash receptacle 36.

To facilitate release of the leaves 14 from the scoop heads 26 and 28, the device 10 can be rotated 90° from the position illustrated in FIG. 9 so that the central handle 34 extends upward and the scoop handles 22 and 24 are oriented approximately parallel with the ground 38.

Figure 2:
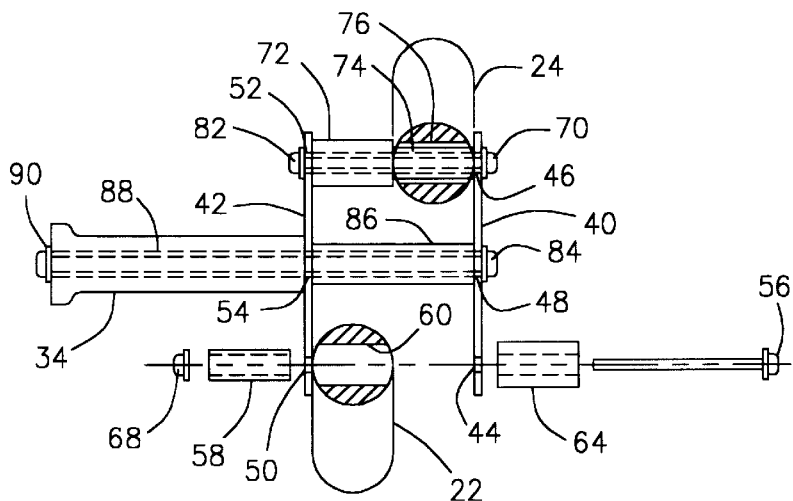
FIG. 2 is a partially cut away and enlarged, cross sectional view of the device of FIG. 1, taken along line 2—2.
Figure 3:
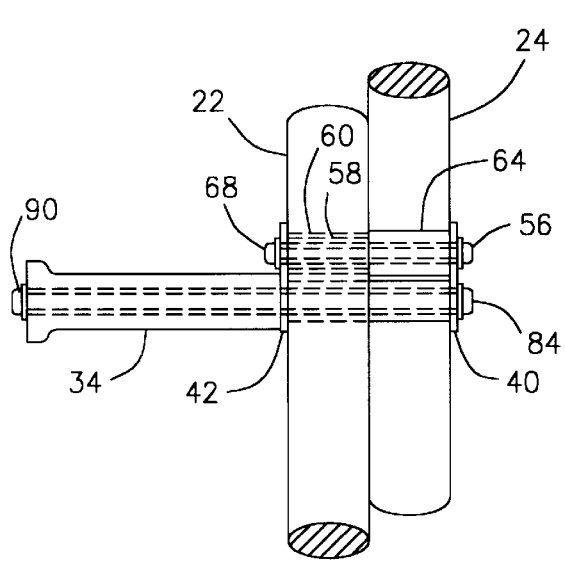
FIG. 3 is a right side elevation of the device shown in FIG. 2.
Figure 4:
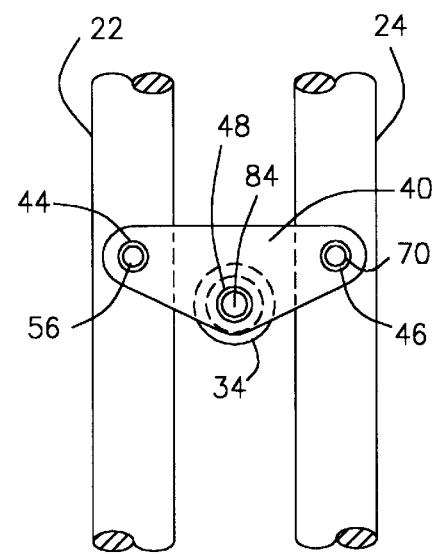
FIG. 4 is a rear elevation of the device of FIG. 3.

The device 10 of FIGS. 1 and 5 through 9 is also shown in FIGS. 2 through 4. FIGS. 2 through 4 illustrate attachment of the central handle 34 to the device 10. The central handle 34 extends outward from the second bracket 42 and is approximately perpendicular to the first and second handles 22 and 24.

Referring now to FIGS. 2 through 4, the device 10 includes two brackets 40 and 42. The first bracket 40 is provided with three bolt openings 44, 46, and 48 extending therethrough, and the second bracket 42 is also provided with three bolt openings 50, 52, and 54. The first, second and third bolt openings 44, 46, and 48 in the first bracket 40 align with the first, second and third bolt openings 50, 52, and 54 in the second bracket 42. Bolts 56, 70, and 84 extend through each of the three pairs of aligned bolt openings, i.e. bolt opening pair 44 and 50, bolt opening pair 46 and 52, and bolt opening pair 48 and 54.

A first bolt 56 extends consecutively through a first bolt opening 44 in the first bracket 40, a first spacer 64, a first sleeve 58 that inserts in a hole 60 that extends through the first leaf scoop handle 22 at a location approximately midway between the lower end 30 and an opposite upper end 62 of the first leaf scoop handle 22, and the first bolt opening 50 provided in the second bracket 42. If a first alternate central handle 34' is employed, as illustrated in FIGS. 13 through 15, instead of the central handle 34, the first bolt 56 also extends through a first side opening 66 that is provided in the first alternate central handle 34'. If a second alternate central handle 34" is employed, as illustrated in FIGS. 10 through 12, instead of the central handle 34 or the first alternate central handle 34', the first bolt 56 extends through the items as described above for the central handle 34. Regardless of which type of central handle 34, 34', or 34" is employed, a first nut 68 secures the first bolt 56. As shown in the drawings, both the first and second alternate central handles 34' and 34" are curved in the configuration of a "D" shape, with the person 12, grasping the first or second alternate central handles 34' and 34" along the straight portion of the "D" shaped central handle handles 34' or 34".

A second bolt 70 extends consecutively through a second bolt opening 46 in the first bracket 40, a second sleeve 74 that inserts in a hole 76 that extends through the second leaf scoop handle 24 at a location approximately midway between the lower end 32 and an opposite upper end 78 of the second leaf scoop handle 24, a second spacer 72, and a second bolt opening 52 in the second bracket 42. If a first alternate central handle 34' is employed, as illustrated in FIGS. 13 through 15, instead of the central handle 34, the second bolt 70 also extends through a second side opening 80 that is provided in the first alternate central handle 34'. If a second alternate central handle 34" is employed, as illustrated in FIGS. 10 through 12, instead of the central handle 34 or the first alternate central handle 34', the second bolt 70 extends through the items as described above for the central handle 34. Regardless of which type of central handle 34, 34', or 34" is employed, a second nut 82 secures the second bolt 70.

A third bolt 84 extends consecutively through a third bolt opening 48 in the first bracket 40, a third spacer 86 that extends between the first and second brackets 40 and 42, a third bolt opening 54 in the second bracket 42, and a central opening 88 provided in the central handle 34. If a first alternate central handle 34' is employed, as illustrated in FIGS. 13 through 15, instead of the central handle 34, the third bolt 84 extends through a first alternate central opening 88' provided in the first alternate central handle 34' instead of extending through the central opening 88. If a second alternate central handle 34" is employed, as illustrated in FIGS. 10 through 12, instead of the central handle 34 or the first alternate central handle 34', the third bolt 84 extends through a second alternate central opening 88" provided in the second alternate central handle 34" instead of extending through the central opening 88. Regardless of which type of central handle 34, 34', or 34" is employed, the third bolt 84 is secured by a third nut 90.

The first and second bolts 56 and 70 serve as axes for pivotal movement of first and second leaf scoops 92 and 94, thereby allowing them to articulate and oppose each other in a manner similar to the action of a pair of salad tongs or scissors. Employment of the first and second spacers 64 and 72 causes the leaf scoops 92 and 94 to be slightly offset from each other, allowing them to articulate without interfering with each other's movement.

The first and second sleeves 58 and 74 help to prevent excessive wear in the holes 60 and 76 of the scoop handles 22 and 24, thus preventing the scoop handles 22 and 24 from failing at these locations.

It is important that the central handle 34, the first alternate central handle 34', or the second alternated central handle 34" lies in a plane that is parallel with each of the associated axes for pivotal movement, i.e. the first and second bolts 56 and 70 and that the central handle, either 34, 34' or 34", be located approximately midway between the two axes for pivotal movement. This is accomplished by having the third bolt 84 approximately midway between the first and second bolts 56 and 70 and approximately parallel with each of the bolts 56 and 70. Since the central handle, either 34, 34' or 34", is secured to the device 10 by the third bolt 84, this allows the central handle, 34, 34', or 34", to be easily gripped by the user when using the device 10 and allows the user to lift the leaves 14 with relative ease because the load is balanced in the user's hands 18 and 20.

Although three different styles of central handles, i.e. 34, 34' and 34", have been illustrated, the invention is not limited to these specific styles of handles. It is to be understood that the invention may utilize other styles of handles that may differ from those shown in the drawings for purposes of illustration.

In order for the device 10 to be able to lift large volumes of leaves, the design of the scoop heads 26 and 28 is also important. Each of the scoop heads 26 and 28 is an enlarge solid surface that has a concave face that extends toward the concave face of its opposing scoop head. Each scoop head 26 and 28 is provided with an opening therein, 96 and 98 respectively, to allow entrained air to escape from the leaves 14 as the leaves are captured between the scoop heads 26 and 28 and to reduce the weight of the scoop heads 26 and 28. The scoop heads 26 and 28 are preferably constructed of plastic so they can be made large and strong enough to accommodate a large bite of leaves 14, while still being light enough in weight so they do not add unnecessarily to the burden that the person 12 must lift in using the device 10. It is important that the scoop heads 26 and 28 be made as light as possible since the person using the device 10 must lift the scoop heads 26 and 28 repeatedly as leaves 14 are gathered, lifted and transported.

The scoop heads 26 and 28 close together, as shown by Arrows "C" and "D" in FIG. 5 to form a football shaped void therebetween for capturing leaves 14. Each scoop head 26 and 28 is increased in its width dimension, 100 and 102 respectively, over prior art leaf or snow scoops and is also increased in its concave depth 104 and 106 respectively, over prior art leaf or snow scoops. Thus the device 10 is able to capture and retain a larger mass of leaves 14 for transport than is possible with other types of hand held leaf moving implements.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A device for gathering and lifting leaves comprising:
a first pivotal axis extending through a handle of a first leaf scoop approximately midway between an upper end of the first leaf scoop and a lower end of the first leaf scoop, a second pivotal axis extending through a handle of a second leaf scoop approximately midway between an upper end of the second leaf scoop and a lower end of the second leaf scoop, said first and said second pivotal axis secured together,
said first and second handles being offset from each other so that heads provided on the lower ends of the leaf scoops open relative to each other as the upper ends of the handles move away from each other and so that the heads of the leaf scoops close relative to each other as the upper ends of the handles move toward each other,
a central handle securing to the pivotal axes approximately midway between the axes so that said central handle extends outward approximately perpendicular to the handles of the leaf scoops, and
each said head having an elongated width dimension and an increased concave depth so that the heads together define a large, football shaped void therebetween for capturing leaves.

2. A device according to claim 1 wherein each head is provided with an opening therein.

3. A device according to claim 1 wherein said central handle is "D" shaped.

4. A device for gathering and lifting leaves comprising
a first pivotal axis extending through a handle of a first leaf scoop approximately midway between an upper end of the first leaf scoop and a lower end of the first leaf scoop, a second pivotal axis extending through a handle of a second leaf scoop approximately midway between an upper end of the second leaf scoop and a lower end of the second leaf scoop, said first and said second pivotal axis secured together,
said first and second handles being offset from each other so that heads provided on the lower ends of the leaf scoops open relative to each other as the upper ends of the handles move away from each other and so that the heads of the leaf scoops close relative to each other as the upper ends of the handles move toward each other,
a central handle securing to the pivotal axes approximately midway between the axes so that said central handle extends outward approximately perpendicular to the handles of the leaf scoops, and
said central handle is straight and extends outward parallel to the two axes.

5. A device for gathering and lifting leaves comprising
a first bracket and a second bracket secured in spaced apart relationship with each other, each bracket provided with three aligned bolt openings extending therethrough,
a first bolt extending through first bolt openings in each bracket, a second bolt extending through second bolt openings in each bracket, a third bolt extending through third bolt openings in each bracket,
said third bolt approximately midway between and approximately parallel to the first and the second bolt, a central handle secured to brackets by said third bolt,
a first handle of a first leaf scoop pivotally secured between said brackets via said first bolt so that said first bolt attaches approximately midway between an upper end and a lower end of the first handle, a second handle of a second leaf scoop pivotally secured between said brackets via said second bolt so that said second bolt attaches approximately midway between an upper end and a lower end of the second handle, and
a concave leaf scoop head provided on the lower end of each of the first and second handles.

6. A device according to claim 5 further comprising
a first spacer provided adjacent to said first handle and adjacent to said first bracket, a second spacer provided adjacent to said second handle and adjacent to said second bracket so that the first and second leaf scoops are offset from each other.

7. A device according to claim 6 further comprising
a first sleeve extending through a hole provided in the first handle, said first bolt extending through said first sleeve in order to pivotally secure said first handle between said brackets, a second sleeve extending through a hole provided in the second handle, and said second bolt extending through said second sleeve in order to pivotally secure said second handle between said brackets.

8. A device according to claim 7 wherein said central handle extends outward approximately perpendicular to said first and second handles.

9. A device according to claim 7 wherein said central handle is a straight handle that extends outward parallel to the first and second bolts.

10. A device according to claim 7 wherein said central handle is "D" shaped.

11. A device for gathering and lifting leaves comprising
a pair of leaf scoops pivotally secured to each other via their handles so that approximately half of each handle extends above the pivotal attachment and approximately half of each handle extends below the pivotal attachment, each handle provided with an individual axis that secures to said pivotal attachment,
a central handle extending outward from the pivotal attachment so that said central handle is approximately perpendicular to the handles of the leaf scoops, and
a head provided at a lower end of the handle of each of the leaf scoops, and each said head having a single inward facing concave face that faces toward the opposing head.

12. A device for gathering and lifting leaves comprising:
a pair of leaf scoops pivotally secured to each other via their handles so that approximately half of each handle extends above the pivotal attachment and approximately half of each handle extends below the pivotal attachment, each handle provided with an individual axis that secures to said pivotal attachment,
a central handle extending outward from the pivotal attachment so that said central handle is approximately perpendicular to the handles of the leaf scoops,
a head provided at a lower end of the handle of each of the leaf scoops, each said head having an inward facing concave face that faces toward the opposing head,
the central handle being secured to the pivotal attachment via a third axis, and said third axis being approximately parallel to the individual handle axes and located therebetween.

13. A device according to claim 12 wherein the central handle is "D" shaped.

* * * * *